(12) United States Patent
Galyas et al.

(10) Patent No.: US 6,205,157 B1
(45) Date of Patent: Mar. 20, 2001

(54) METHOD FOR PROPAGATION DELAY CONTROL

(75) Inventors: Johan Karoly Peter Galyas; Stefan Wilhelm Jung, both of Täby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 08/873,524

(22) Filed: Jun. 12, 1997

Related U.S. Application Data

(60) Provisional application No. 60/030,015, filed on Nov. 1, 1996.

(51) Int. Cl.⁷ .................................................. H04J 3/12
(52) U.S. Cl. ...................... 370/503; 370/336; 370/345; 370/508
(58) Field of Search .................................. 370/315, 321, 370/337, 347, 350, 442, 503, 328, 336, 345, 508, 509

(56) References Cited

U.S. PATENT DOCUMENTS

| | | | |
|---|---|---|---|
| 5,483,531 | * | 1/1996 | Jouin et al. ........................ 370/465 |
| 5,640,396 | * | 6/1997 | Cudak et al. ...................... 370/337 |
| 5,793,744 | * | 8/1998 | Kanerva et al. .................... 370/342 |
| 5,802,046 | * | 9/1998 | Scott ................................. 370/329 |

FOREIGN PATENT DOCUMENTS

| | | |
|---|---|---|
| 0 618 746 | 10/1994 | (EP) . |
| WO 95 16330 | 6/1995 | (WO) . |
| WO 96 08885 | 3/1996 | (WO) . |
| WO 96/08885 | * 3/1996 | (WO) . |
| WO 96 07249 | 3/1996 | (WO) . |

OTHER PUBLICATIONS

International Search Report, Jun. 10, 1998.

* cited by examiner

*Primary Examiner*—Chi H. Pham
*Assistant Examiner*—Frank Duong
(74) *Attorney, Agent, or Firm*—Jenkens & Gilchrist, P.C.

(57) ABSTRACT

A method for maintaining synchronization between a base transceiver station (BTS) and an interworking function (IWF) within a cellular communications network is disclosed. The method utilizes a synchronization procedure between the IWF and the BTS that makes the IWF aware of propagation delays between the IWF and BTS. The IWF utilizes this information to adapt to the delays such that the correct sequence is unpacked uplink when obtained from the base transceiver station. The IWF also uses synchronization data to control transmissions from the IWF to the BTS such that frame numbers and timeslots are received at the BTS in the correct sequence.

29 Claims, 6 Drawing Sheets

METHOD FOR PROPAGATION DELAY CONTROL

RELATED APPLICATIONS

This Application claims the benefit of prior filed and co-pending U.S. Provisional Application Ser. No. 60/030,015, entitled "Multiframe Synchronization Control", filed Nov. 1, 1996 (Docket No. 27946-199L, Inventors: Peter Galyas, Stef an Jung, Martin Bakhuizer, Caisa Carneheisu, Per-Olof Anderson, and Lars Malm).

BACKGROUND OF THE INVENTION

1. Technical Field of the Invention

The present invention relates to propagation delays within transport networks of telecommunication systems, and more particularly, to a method of controlling propagation delays in a transport network by synchronizing an external node to a synchronous air interface.

2. Description of Related Art

In a cellular communication network, the synchronized air interface and an external network node, such as PLMN, PSTN, ISDN, or Packet Data Network are interconnected via a separated node such as an interworking function (IWF) or packet control unit (PCU) and a base transceiver station (BTS) over an associated transport network. However, the separation between the IWF and base transceiver station invites propagation delays over the transport network between these devices. The delays create problems with reassembling data transmitted over the transport network. For transport networks using only a single traffic channel for calls, these delays must be minimized. For transport networks using more than one traffic channel, the delays must be minimized and independent delay variations within the system must be determined in order to recreate the transmitted data stream.

One solution for combating independent time delay on different sub-channels in a fixed cellular network involves the use of a terminal adaptation function (TAF) at the mobile station, and the use at the IWF of a multi frame structure in conjunction with sub-channel memory. An inband signal is generated using redundant control bits in the CCITT V.110 frames. One bit is used for each multiframe structure and three bits are used for sub-channel numbering. This sequence resolves a delay variation of up to (n−1)/2 (where n=number of bits used in sequence) V.110 frames. However, this solution has several drawbacks.

The maximum sub-channel delay variation cannot be determined from only the algorithmic delays. Considerable delay variations may arise within the transport networks where the sub-channels may be independently routed. Furthermore, the inband signaling is transferred over the air interface where bit error rates can be very high. The error rate on the air interface and the length of the multi frame structure cause long synchronization and resynchronization times. There is also a risk of false detection. Furthermore, each of these proposed solutions have been generated with respect to the use of high-speed circuit-switched data and does not provide solutions for other types of implementations such as GPRS. Thus, alternative solutions are necessary.

SUMMARY OF THE INVENTION

The present invention overcomes the foregoing and other problems with a method for maintaining synchronization between a first node, preferably comprising a base transceiver station (BTS), and a second node, preferably comprising either an interworking function (IWF) or packet control unit (PCU), within a cellular communications network. Initially, an uplink synchronization frame is transmitted from the base transceiver station to an interworking function. This causes the IWF to transmit a downlink synchronization frame to the BTS. The downlink synchronization frame contains downlink synchronization data useful in synchronizing the connection between the BTS and IWF. Upon receipt of the downlink synchronization data by the BTS, the BTS marks the received downlink sequence number SeqD with the associated adjusted frame number downlink (aFNd), and a time margin between the downlink sync frames and the air interface may be determined.

The SeqD marked with aFNd, the time margin and other uplink synchronization data are transmitted to the interworking function within an uplink synchronization frame. Receipt of the uplink sync data at the interworking function initiates a determination of the unpacking sequence for the frames transmitted to the IWF. Determination of the unpacking sequence consists of determining the phase of frames from different subchannels that have the same adjusted frame number uplink (aFNu) and uplink sequence number. The determined phases gives the unpacking sequence.

Once the interworking function receives downlink synchronization information from the uplink synchronization frames, the delays in the downlink direction for each individual subchannel may be determined. The delays are used to arrange the transmission in the downlink direction, such that the frame numbers and timeslots are received in increasing downlink sequence number order at the BTS.

The communications link between the base transceiver station and the interworking function may be monitored to determine whether synchronization is maintained in both the uplink and downlink directions. If synchronization is lost in the downlink direction, the synchronization procedures discussed above may be reinitiated to recover synchronization.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
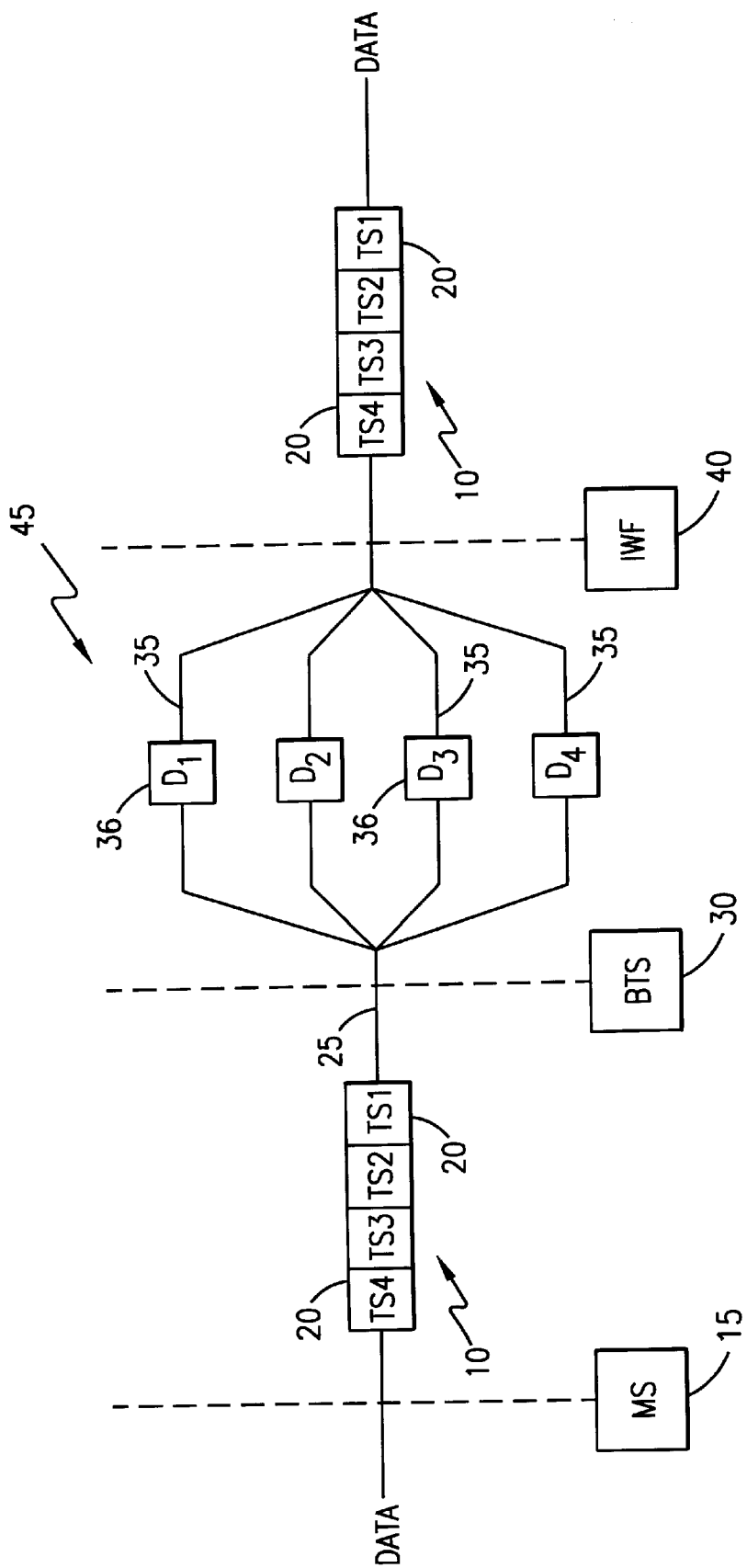
FIG. 1 is a diagram illustrating the separation of a data stream into a plurality of sub-channels.

Referring now to the drawings, and more particularly to FIG. 1, there is illustrated the transmission of a single data stream 10 over a plurality of data sub-channels 35. The single data stream 10 originates at a mobile station 15. The data stream 10 is divided into a plurality of timeslots 20 which are transmitted via a synchronized air interface 25 to the base transceiver station 30. The data stream 10 is received at the base transceiver station (BTS) 30 and forwarded to an interworking function (IWF) 40 over a plurality of separate sub-channels 35. Each of the plurality of separate sub-channels 35 includes an independent delay 36 that affects transmission of the timeslots 20 over the transport network 45.

The interworking function 40 repacks the plurality of timeslots 20 into the original data stream 10 that was transmitted from the mobile station 15. Unfortunately, this repacking process is complicated by the time delays 36 that occur over the transport network 45. Delays on the transport network 45 arise from the different routing pathways which may be followed by individual timeslots 20 between the base transceiver station 30 and interworking function 40.

Figure 2:
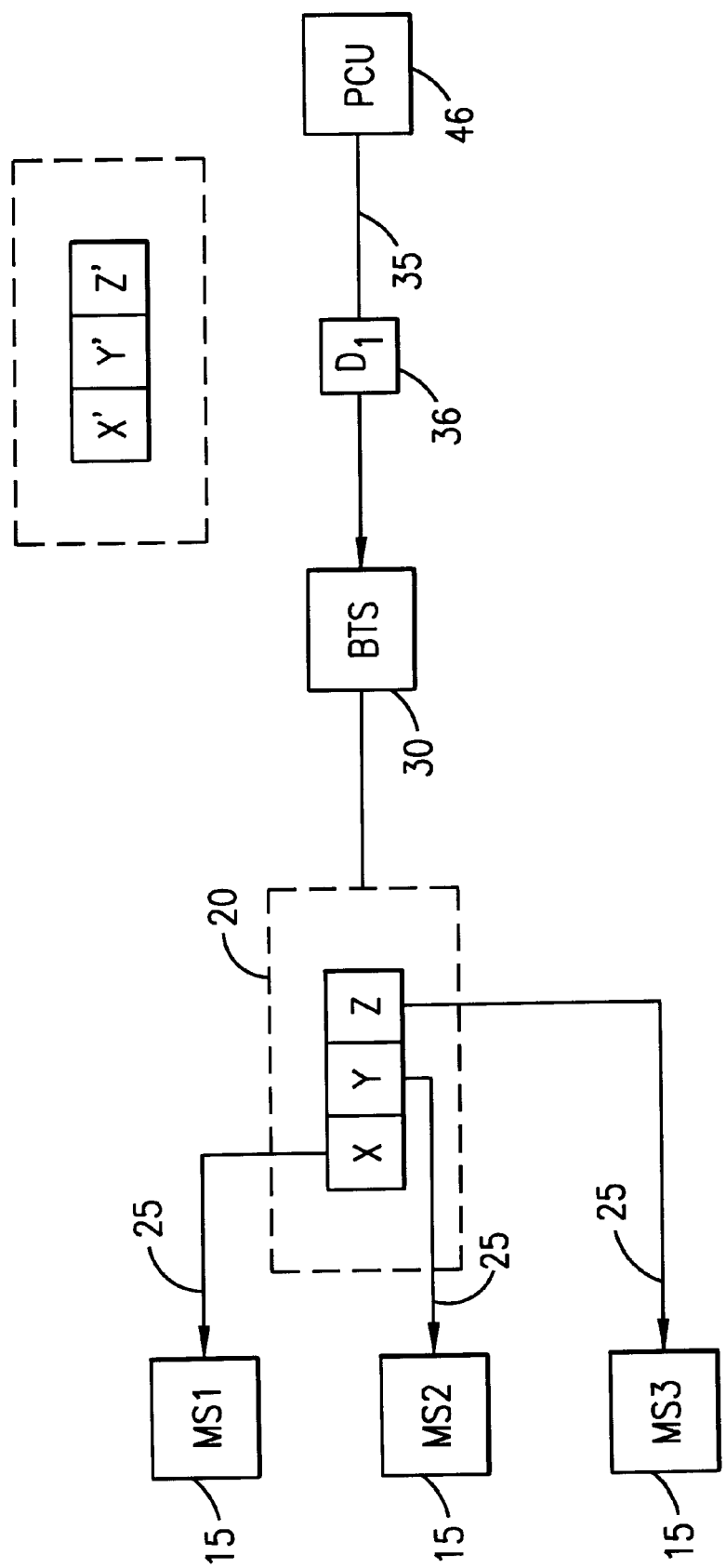
FIG. 2 is an illustration of the delays generated within a GPRS system.

Referring now to FIG. 2, there is illustrated an alternative environment in which the present invention would be utilized. A data packet is transmitted from a packet control unit (PCU) 46 to a base transceiver station 30 through a transport network 45 on a single sub-channel 35. As before, the single sub-channel 35 induces a particular amount of delay 36 over the sub-channel interconnecting the PCU 46 to the BTS 30. The data packet is then transmitted from the BTS 30 to each of the mobile stations 15 over the synchronized air interface 25 within a single timeslot 20.

Figure 3:
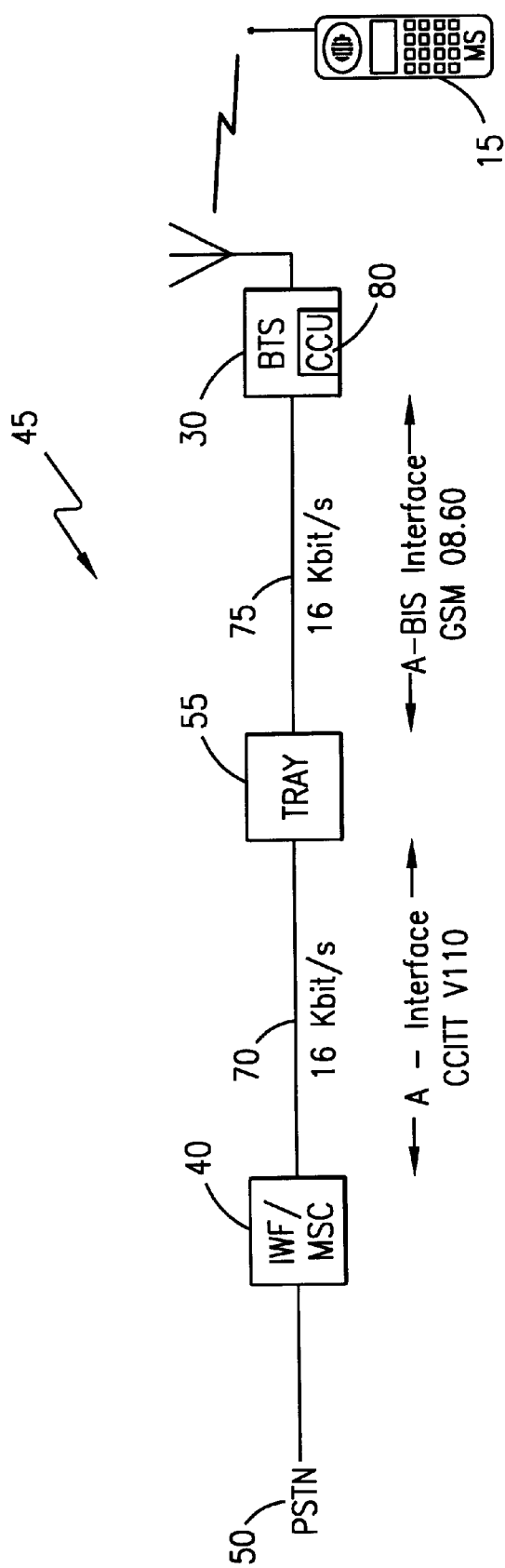
FIG. 3 is an illustration of the transport network.

Referring now to FIG. 3, there is illustrated in more detail, the transport network 45 between the mobile station 15, base transceiver station 30 and interworking function 40 or PCU 46. With the further development of user applications within a public land mobile network (PLMN), a number of high capacity non-speech data services have been introduced. Such services include all circuit-switched data services as defined in TSGSM02.02 and TSGSM02.03, as well as other GSM phase 2+services, including facsimile transmission, high-speed circuit-switched data (HSCSD), high-speed modem connections, and general packet radio services (GPRS). As a result, a telecommunications module known as an interworking function (IWF) 40 has been developed to enable the transmission and protocol adaptation from one telecommunications network, such as a connected PSTN 50, to the serving PLMN. The IWF 40 may be co-located with a particular mobile switching center (MSC) serving a designated geographic area or may be implemented as a separate telecommunications node. The IWF 40 is connected to a transcoder/rate adapter unit (TRAU) 55. The TRAU 55 is further connected to a number of base transceiver stations (BTS) 30 providing radio coverage for mobile stations 15 located within the serving MSC coverage area.

A communications link 70 established between the IWF 40 and the TRAU 55 is known as an "A-interface" within the global system for mobile communications (GSM) system, and uses international telegraph and telephone consulting committee (CCITT) V.110 formatted frames to format user data therebetween. The communications link 70 is capable of transporting 16 Kbps data per channel while communicating 5 ms CCITT V.110 frames carrying 9.6 Kbps user data payload. The remaining bandwidth is utilized for synchronization and control data transport to facilitate communication of the 9.6 Kbps user data payload between the serving IWF 40 and TRAU 55.

A communications link 75 established between the TRAU 55 and the serving BTS 30 is known as an "A-BIS" interface within the GSM specification. In accordance with GSM 08.60 specification, which specifies the formatted speech and data frames between a BTS 30 and the TRAU 55, when the TRAU is located remotely from the BTS the A-BIS interface 75 provides a 16 Kbps data rate while transporting GSM 08.60 formatted 20 ms data frames. Data is transferred between a channel codec unit (CCU) 80 within the BTS 30 and TRAU 55 by using "TRAU frames" formatted in accordance with the GSM 08.60 specification. Within these frames, speech/data, synchronization pattern and TRAU associated control data are included and transmitted. As a result, out of the 16 Kbps of data, only 13.5 Kbps are utilized to transport user data and the remaining bandwidth is utilized to communicate synchronization and control data therebetween. The TRAU 55 performs the necessary transcoding and rate adaption to facilitate the communication of user data between the IWF 40 and the BTS 30.

Figures 4, 5, 6:
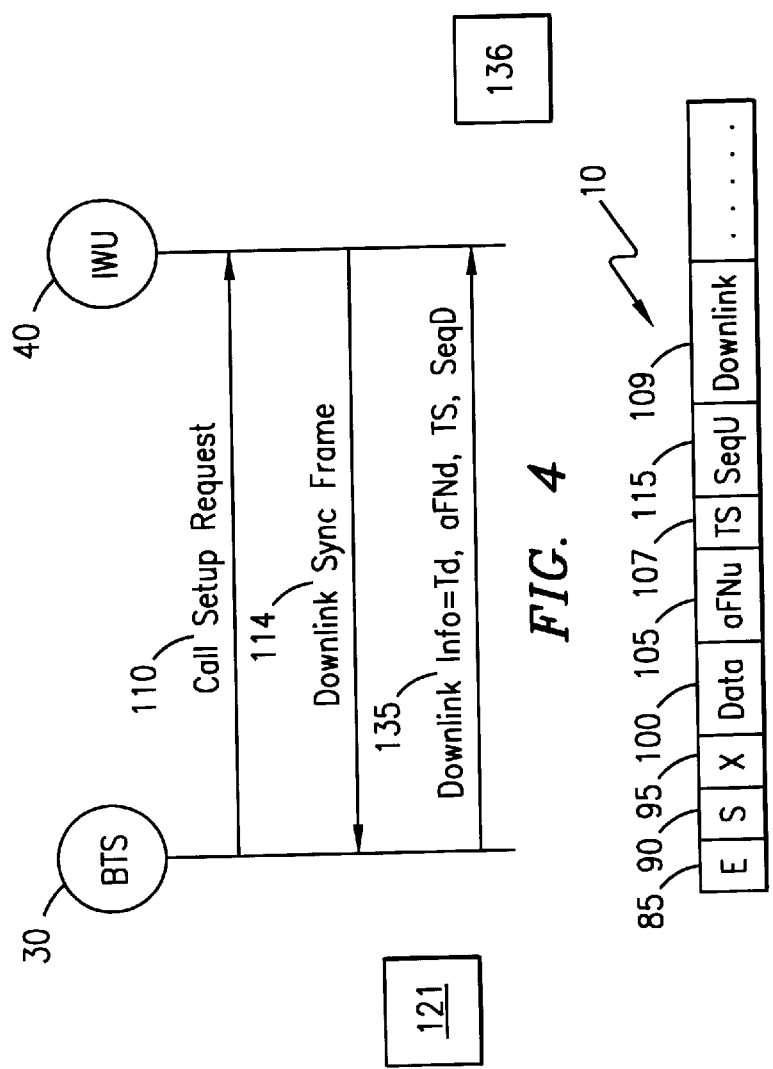
FIG. 4 is a diagram of the synchronization signals and procedures to obtain signal synchronization between the base transceiver station and the interworking function.
FIG. 5 is an illustration of an V.110 uplink synchronization frame.
FIG. 6 is an illustration of a V.110 downlink synchronization frame.

Referring now to FIG. 4, wherein there is presented a diagram illustrating the various signals and procedures utilized for synchronizing an external node (IWF or PCU) to a synchronous air interface at the BTS 30. For purposes of the following description, the procedure between a IWF 40 and BTS 30 will be described. However, the procedures are equally applicable between a PCU and BTS for a general packet radio system (GPRS). The method relies on the fact that the air interface is synchronized and solves the problem of variable independent delays by introducing synchronization procedures between the IWF 40 and BTS 30. The method makes the IWF 40 aware of propagation delays between the IWF and the BTS 30. This information is utilized by the IWF 40 to adapt to the delays such that a correct data stream sequence is unpacked uplink when obtained from the BTS 30.

When a call is being setup and no data is received, the BTS 30 transmits TRAU frames with idle data to the IWF 40. These frames are identified as V.110 uplink sync frames 78 and are illustrated in FIG. 5. All E,S,X and data bits (85,90,95,100) within a CCITT V.110 frames are set to a binary one in the uplink direction. At the IWF 40 this is interpreted as idle data since in transparent mode the data rate indicated in the E1, E2, and E3 bits of the V.110 frames are undefined, and in nontransparent mode, the radio link protocol (RLP) frame is not found. This fact is used to define a signaling path between the BTS 30 and the IWF 40. In each idle CCITT V.110 frame, the adjusted frame number uplink (aFNu) 105 is adjusted to the last received burst in the corresponding channel coding block, modulo 104 and timeslot (TS) 107 information is included. All CCITT V.110 frames belonging to the same channel coding block are also marked with a sequence number (SeqU) 115 in the uplink direction in order to achieve a resolution of one CCITT V.110 frame. Downlink information 109 is also included.

Referring now back to FIG. 4, when a call setup request 110 for either transparent or non-transparent data is transmitted from the BTS 30 to the IWF 40, the IWF 40 begins transmitting a synchronization pattern to the BTS 30 known as a V.110 downlink sync frame 115 (FIG. 6) in order to achieve synchronization between the IWF 40 and the air interface. The V.110 downlink sync frame 114 consists of all data bits 116 of a V.110 frame set to a binary one and all status bits 117 are off. Further included with each V.110 downlink sync frame 114 is an 8 bit downlink sequence number (SeqD) 118. Finally, the E1, E2 and E3 bits 119 are set to binary one. The V.110 downlink sync frames 114 are mapped onto the A-interface in increasing sub-channel order as they are transmitted between the IWF 40 and BTS 30.

Figures 7, 8:
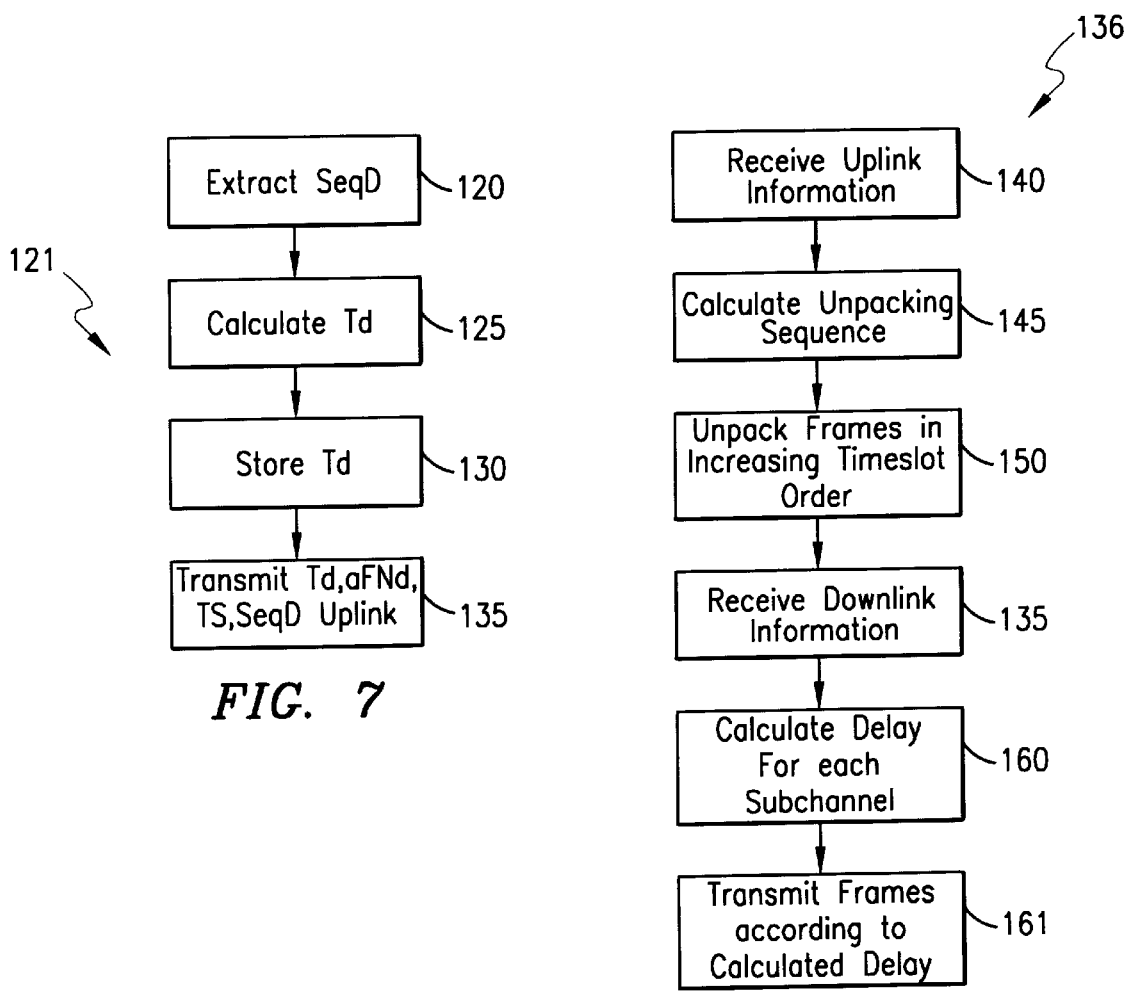
FIG. 7 is a flow diagram of the synchronization procedures performed at the base transceiver station.
FIG. 8 is a flow diagram of the synchronization procedures performed at the interworking function.

Once the BTS 30 receives the V.110 downlink sync frames 114 from the IWF 40, the process steps identified generally at 121 and illustrated more fully in FIG. 7 are performed. The BTS 30 marks the downlink sequence number (SeqD) 118 with the associated frame number downlink (aFNd) and extracts at step 120 the downlink sequence number (SeqD) 118 from the first V.110 downlink sync frame 114 within the TRAU 55. Using this information, the time margin (Td) between the air interface and the downlink sync frames 114 is calculated at step 125 and stored at step 130 with the adjusted frame number downlink (aFNd) associated with the downlink sequence number. The aFNd is defined to be the frame number adjusted to the first burst in the corresponding channel coding block which is transmitted. The aFNd acts as a time stamp for the downlink sequence number. This information is transmitted in the uplink direction at step 135 toward the IWF 40 within a V.110 uplink sync frame 78 as downlink information 109.

Upon receipt of the uplink sync frame 78, the IWF 40 performs several steps designated generally as 136 and more fully described in FIG. 8. In the transparent mode, when the IWF 40 receives the uplink information (aFNu, SeqU and Td) at step 140, the unpacking sequence for the V.110 frame may be calculated at step 45. This is accomplished by determining the phase of frames from different sub-channels that have the same aFNu and SeqU. Frames with a larger phase difference are unpacked first. Once the phase is determined, the V.110 frames are unpacked at step 150 in increasing timeslot order.

When the IWF 40 receives the downlink information (aFNd, SeqD, Td and TS) at step 135. This information is used to calculate the delays in the downlink direction for each sub-channel at step 160. This is accomplished by delaying each sub-channel for an amount necessary such that for the same aFNd and TS in increasing order provide increasing values for SeqD. This delay corresponds to the buffering delay between the IWF 40 and the BTS 30. By delaying signals transmitted at step 161 from the IWF 40 to the BTS 30 by this amount, the IWF may be synchronized with the air interface, and signal received by the BTS in increasing TS order.

In synchronous transparent mode, Td is not used since the phase of the TRAU frames on the A-BIS interface cannot be manipulated by the IWF 40 to achieve resolution below block level. In an asynchronous transparent mode, Td could be used to manipulate the TRAU frames. In non-transparent mode, Td is used to adjust the phase of an RLP frame to minimize the downlink buffer delay in the BTS 30 for up to 15 ms. If the created buffering delay for one sub-channel in the IWF 40 exceeds 20 ms, the delay can be reduced in 20 ms steps by mapping RLP frames in a different TS order and overriding the created buffer.

Figure 9:
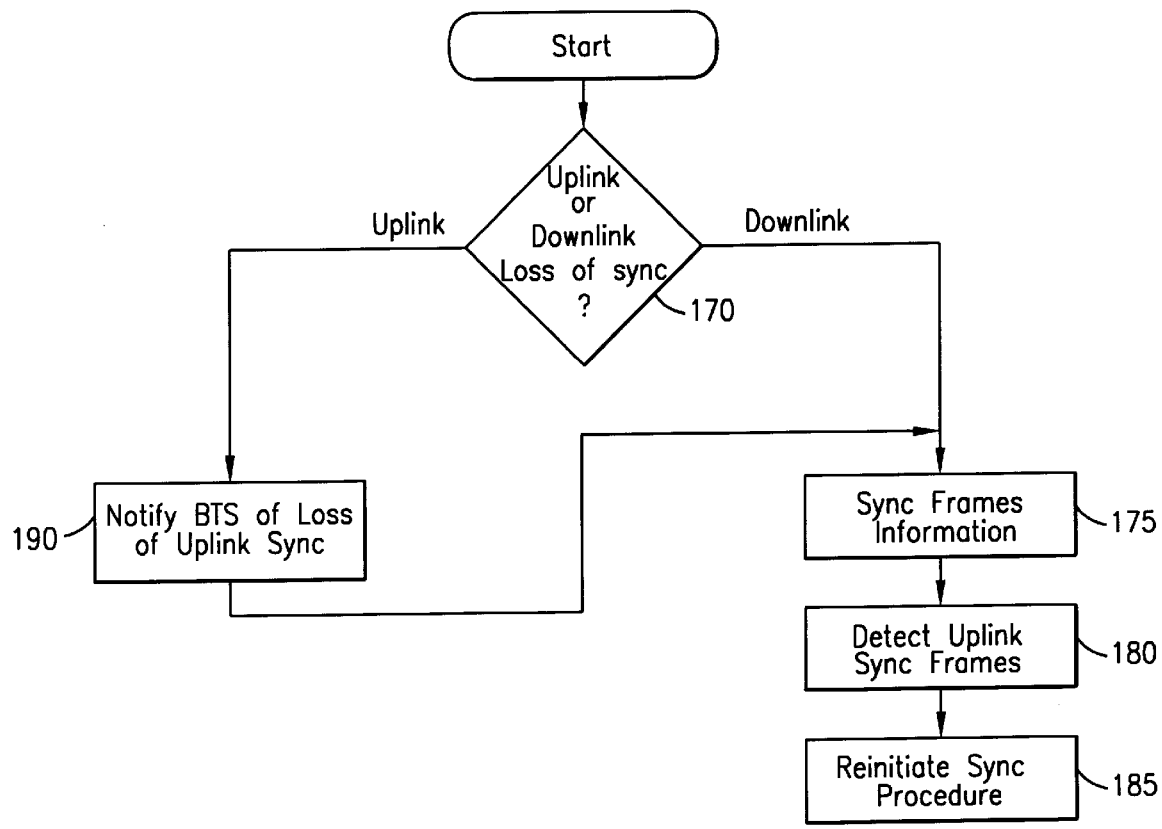
FIG. 9 is a flow diagram of the resynchronization procedures.

Referring now to FIG. 9, there is illustrated a flow diagram describing the procedures in the case of a loss of synchronization. Inquiry step 170 determines if synchronization is lost in the uplink or downlink direction. If the synchronization is lost in the downlink direction, the BTS 30 begins transmitting V.110 uplink synchronization frames 78 at step 175. The transmitted uplink synchronization frames 78 are detected by the IWF 40 at step 180, and the synchronization procedure is reinitiated at step 185 in the manner described above. If the synchronization is lost in the uplink direction, the IWF 40 informs the BTS 30 at step 190. The BTS 30 then reinitiates the synchronization procedure at step 175.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for synchronizing transmission of a data stream between a wireline network node and a base transceiver station, the base transceiver station connected with an air interface within a cellular communications system, the method comprising the steps of:

a) transmitting from the base transceiver station to the wireline network node uplink synchronization frames containing uplink synchronization data;

b) transmitting from the wireline network node to the transceiver station downlink synchronization frames containing downlink synchronization data in response to receipt of the uplink synchronization frames;

c) determining from the uplink synchronization data, an unpacking sequence for time slots of the data stream transmitted over independently routable subchannels of a wireline transport network between the wireline network node and the base transceiver station; and d) unpacking the data stream according to the determined unpacking sequence such that the time slots are unpacked in increasing sequence number order.

2. The method of claim 1 further including the steps of:

receiving downlink information at the wireline network node within the uplink synchronization frames;

determining delays for the subchannels from the downlink information; and transmitting the data stream on the subchannels in accordance with the determined delays.

3. The method of claim 2 wherein the step of determining delays for the subchannels further comprises the step of delaying transmission on each subchannel such that frame numbers and timeslots are received in increasing downlink sequence number order at the base transceiver station.

4. The method of claim 1 wherein the step of determining the unpacking sequence comprises the step of determining a phase of frames from the subchannels having a same uplink frame number and uplink sequence number.

5. The method of claim 1 further including the steps of:

calculating a time margin between the downlink synchronization frames and the air interface; and minimizing delays between the wireline network node and the base transceiver station using the time margin.

6. The method of claim 1 wherein the wireline network node comprises an interworking function.

7. The method of claim 1 wherein the wireline network node comprises a packet control unit.

8. The method of claim 1 wherein the step of transmitting from the base transceiver station to the wireline network node further includes the step of adjusting an adjusted frame number uplink of each uplink synchronization frame to a last received burst in a corresponding channel coding block.

9. The method of claim 1 wherein the step of transmitting from the base transceiver station to the wireline network node further includes the step of adding an uplink sequence number to each uplink synchronization frame.

10. The method of claim 1 wherein the step of transmitting from the base transceiver station to the wireline network node further includes the step of attaching downlink information to the uplink synchronization frame.

11. The method of claim 1 wherein the step of transmitting from the wireline network node to the base transceiver station comprises the step of attaching a downlink sequence number to the downlink synchronization frame.

12. A method for synchronizing transmission of a data stream between a wireline network node and a base transceiver station, the base transceiver station connected with an air interface within a cellular communications system, the method comprising the steps of:
   a) transmitting from the base transceiver station to the wireline network node uplink synchronization frames comprising V.110 frames containing uplink synchronization data, the uplink synchronization frames each containing an adjusted frame number uplink and an uplink sequence number;
   b) transmitting from the wireline network node to the base transceiver station, in response to receipt of the uplink synchronization frames, downlink synchronization frames comprising V.110 frames containing downlink synchronization data, the downlink synchronization frames each containing a downlink sequence number;
   c) comparing a phase of frames from independently routable subchannels of a wireline transport network between the wireline network node and the base transceiver station with the same adjusted frame number uplink and uplink sequence number to determine an unpacking sequence for the data stream transmitted over the independently routable subchannels; and
   d) unpacking the transmitted data stream according to the determined unpacking sequence such that the data stream is unpacked in increasing sequence number order.

13. The method of claim 12 further including the steps of:
   receiving downlink information at the wireline network node within the uplink synchronization frames;
   determining delays for the subchannels from the downlink information; and
   transmitting on the subchannels according to the determined delays.

14. The method of claim 13 wherein the step of determining delays for the subchannels further comprises the step of delaying each subchannel such that frame numbers and timeslots are received in increasing downlink sequence number order at the base transceiver station.

15. The method of claim 12 further including the steps of:
   calculating a time margin between downlink synchronization frames and the air interface; and
   minimizing the delays of the subchannels between the wireline network node and the base transceiver station using the time margin.

16. The method of claim 12 wherein the wireline network node comprises an interworking function.

17. The method of claim 12 wherein the wireline network node comprises a packet control unit.

18. The method of claim 12 wherein the step of transmitting from the base transceiver station to the wireline network node further includes the step of adding an uplink sequence number to each uplink synchronization frame.

19. The method of claim 12 wherein the step of transmitting from the wireline network node to the base transceiver station comprises the step of attaching a downlink sequence number to the downlink synchronization frame.

20. A method for synchronizing transmission of a data stream between a first node and a second node connected within an interface of a wireline transport network within a cellular communications system, comprising the steps of:
   initializing a synchronization request from the second node;
   transmitting synchronization frames to determine a corresponding timing delay for independently routable subchannels of the wireline transport network between the first node and the second node in response to the synchronization request;
   determining the corresponding timing delay of the independently routable subchannels of the wireline transport network between the first and the second node; and
   controlling the data stream at the first node in response to the determined timing delay.

21. The method of claim 20 wherein the step of initializing further comprises the step of transmitting uplink synchronization frames from the second node to the first node.

22. The method of claim 20 wherein the step of transmitting further includes the step of transmitting downlink synchronization frames containing downlink synchronization data.

23. The method of claim 20 wherein the step of determining further includes the steps of:
   calculating the timing delay at the second node from the synchronization frames; and
   transmitting the timing delay back to the first node.

24. The method of claim 23, further including the step of determining an unpacking sequence for timeslots of the transmitted data stream.

25. The method of claim 24 wherein the step of controlling comprises the step of unpacking the data stream according to the unpacking sequence.

26. The method of claim 23, further including the step of determining delays for each subchannel of the wireline transport network from the timing delay.

27. The method of claim 26 wherein the step of controlling comprises the step of transmitting over the subchannels according to the determined delays.

28. The method of claim 20 wherein the second node comprises a base transceiver station and the first node comprises an interworking function.

29. The method of claim 20 wherein the second node comprises a base transceiver station and the first node comprises a packet control unit.

* * * * *

UNITED STATES PATENT AND TRADEMARK OFFICE
CERTIFICATE OF CORRECTION

PATENT NO. : 6,205,157 B1
DATED : March 20, 2001
INVENTOR(S) : Stefan Jung et al.

It is certified that error appears in the above-identified patent and that said Letters Patent is hereby corrected as shown below:

Column 6,
Lines 15-16, replace "the transceiver" with -- the base transceiver --

Signed and Sealed this

Eleventh Day of December, 2001

Attest:

NICHOLAS P. GODICI
Attesting Officer   Acting Director of the United States Patent and Trademark Office